(12) United States Patent
Fujiwake et al.

(10) Patent No.: US 10,985,408 B2
(45) Date of Patent: Apr. 20, 2021

(54) MANUFACTURING APPARATUS FOR ELECTRODE LAMINATE

(71) Applicant: Murata Manufacturing Co., Ltd., Nagaokakyo (JP)

(72) Inventors: Koichiro Fujiwake, Nagaokakyo (JP); Hideyasu Kamigawa, Nagaokakyo (JP); Takeshi Yamamoto, Nagaokakyo (JP); Sadao Nishida, Nagaokakyo (JP); Jiro Kamiura, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 210 days.

(21) Appl. No.: 16/397,173

(22) Filed: Apr. 29, 2019

(65) Prior Publication Data

US 2019/0252730 A1 Aug. 15, 2019

Related U.S. Application Data

(63) Continuation of application No. PCT/JP2017/032343, filed on Sep. 7, 2017.

(30) Foreign Application Priority Data

Dec. 21, 2016 (JP) ............................. JP2016-247450

(51) Int. Cl.
*H01M 4/82* (2006.01)
*H01M 10/0585* (2010.01)
*H01M 4/04* (2006.01)
*H01M 10/04* (2006.01)
*B65H 23/038* (2006.01)

(52) U.S. Cl.
CPC ...... *H01M 10/0585* (2013.01); *B65H 23/038* (2013.01); *H01M 4/043* (2013.01); *H01M 10/04* (2013.01); *H01M 10/0404* (2013.01)

(58) Field of Classification Search
CPC ......... H01M 10/0585; H01M 10/0583; H01M 10/058; H01M 10/04; H01M 10/0404;
(Continued)

(56) References Cited

U.S. PATENT DOCUMENTS 9,083,007 B2 * 7/2015 Wu ...................... H01M 6/005
2013/0133184 A1 * 5/2013 Bacci ................ H01M 10/0583
29/623.1
2015/0162638 A1 * 6/2015 Bernini ............. H01M 10/0404
429/142

FOREIGN PATENT DOCUMENTS

JP H09169456 A 6/1997
JP H09221252 A 8/1997
(Continued)

OTHER PUBLICATIONS

International Search Report issued for PCT/JP2017/032343, dated Dec. 12, 2017.
(Continued)

*Primary Examiner* — Raymond Alejandro
(74) *Attorney, Agent, or Firm* — Arent Fox LLP (57) ABSTRACT

An electrode supply unit corrects an electrode target position based on a positional displacement amount of a first separator material, a first offset amount which is an actual positional displacement amount between the first separator material and an electrode when the first separator material is supplied in a manner that a positional displacement is not generated, and a movement amount in a lateral direction when an electrode supply region moves from a first position T1 to a second position T2 The electrode supply unit then supplies the electrode to the first separator material. A joining head corrects a joining target position based on a positional displacement amount of the electrode, a second offset amount which is an actual positional displacement amount which occurs when positions of the electrode and
(Continued)

the joining head are adjusted so as not to cause positional displacement, and a movement amount in the lateral direction when the electrode supply region moves from the third position T3 to the fourth position T4. The joining head then joins the separator materials.

4 Claims, 8 Drawing Sheets

(58) Field of Classification Search
CPC ... H01M 4/043; B65H 23/038; B65H 23/035; B65H 23/032; Y10T 29/5313; Y10T 29/53135; Y10T 29/53139
See application file for complete search history.

(56) References Cited

FOREIGN PATENT DOCUMENTS

| | | |
|---|---|---|
| JP | H10310297 A | 11/1998 |
| JP | 2007242507 A | 9/2007 |
| JP | 2012033282 A | 2/2012 |
| JP | 2012074402 A | 4/2012 |
| JP | 2016035915 A | 3/2016 |

OTHER PUBLICATIONS

Written Opinion of the International Searching Authority issued for PCT/JP2017/032343, dated Dec. 12, 2017.

* cited by examiner

|    | S1  | S2  | ... | ... | S20 | S21 |
|----|-----|-----|-----|-----|-----|-----|
| T1 | +10 | +7  | ... | ... | +10 | +8  |
| T2 | +5  | +3  | ... | ... | +13 | +7  |
| T3 | -10 | -14 | ... | ... | -7  | -5  |
| T4 | -25 | -10 | ... | ... | -10 | -19 |

MANUFACTURING APPARATUS FOR ELECTRODE LAMINATE

CROSS REFERENCE TO RELATED APPLICATIONS

The present application is a continuation of International application No. PCT/JP2017/032343, filed Sep. 7, 2017, which claims priority to Japanese Patent Application No. 2016-247450, filed Dec. 21, 2016, the entire contents of each of which are incorporated herein by reference.

TECHNICAL FIELD

The present invention relates to a manufacturing apparatus for an electrode laminate having a structure in which an electrode is sandwiched between a first separator and a second separator.

BACKGROUND OF THE INVENTION

A battery is known including an electrode body having a structure in which a plurality of positive electrodes and a plurality of negative electrodes are alternately stacked with a separator interposed there between. An electrode body having such a structure is formed, for example, by alternately laminating a plurality of electrode laminates having a structure in which one of a positive electrode and a negative electrode is sandwiched between a first separator and a second separator, and the other ones of the positive and negative electrodes.

As a method for manufacturing such an electrode body, Japanese Patent Application Laid-Open No. 2012-74402 (Patent Document 1) describes a method in which a positive electrode and a negative electrode are alternately and repeatedly placed on an elongated separator along its longitudinal direction, another elongated separator is further laminated on the above, and then the above laminated body is folded in such a manner that the positive electrode and the negative electrode alternately overlap with each other, so that an electrode body in which the positive electrode and the negative electrode are alternately laminated with the separator interposed there between is manufactured.

Further, Japanese Patent Application Laid-Open No. 9-221252 (Patent Document 2) describes a technique, in which, when an elongated positive electrode sheet, an elongated separator, and an elongated negative electrode sheet are laminated, an edge sensor detects a positional displacement of the positive electrode sheet with respect to the separator and the negative electrode sheet that are previously laminated and the positional displacement is corrected.

Figure 9:
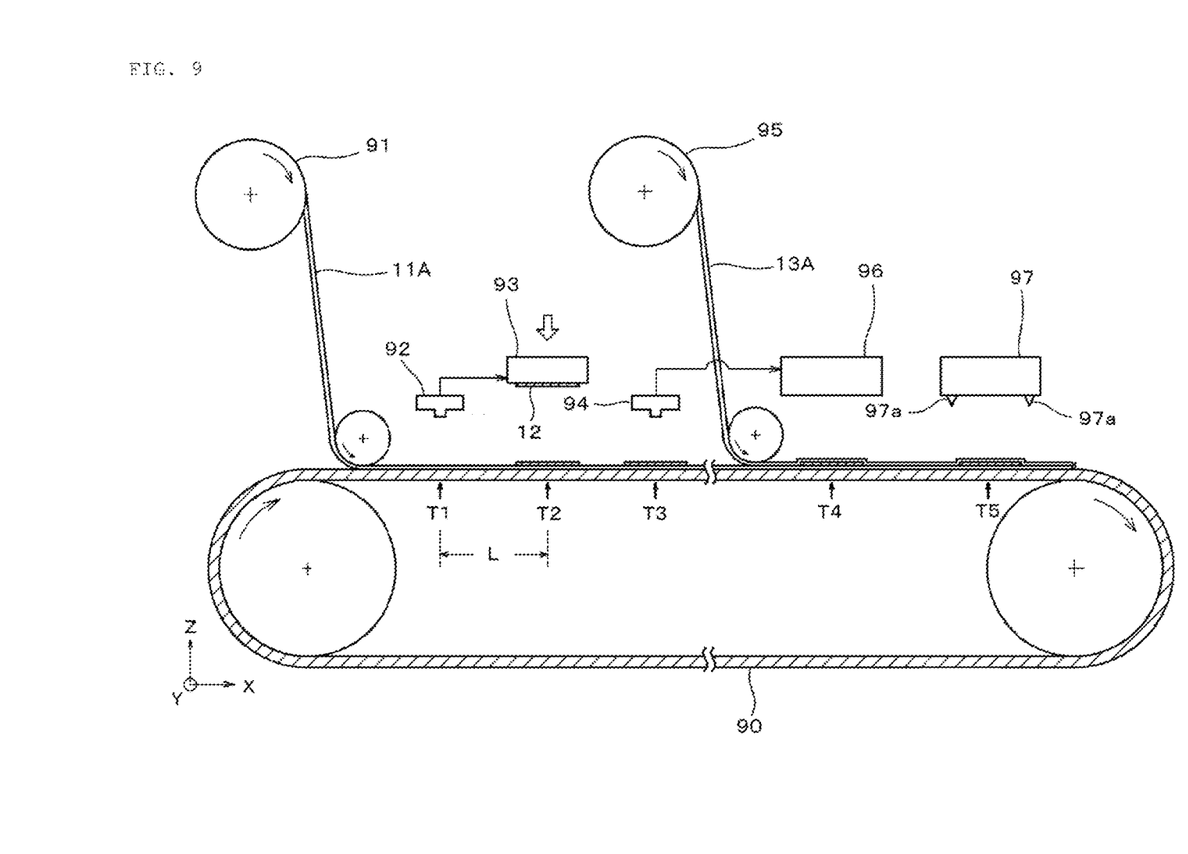
FIG. 9 is a side view showing a schematic configuration of an apparatus for manufacturing an electrode laminate, which can be considered from Patent Documents 1 and 2.

According to Patent Documents 1 and 2, a manufacturing apparatus having a configuration as shown in FIG. 9 is conceivable as an apparatus for manufacturing an electrode laminate.

In the manufacturing apparatus shown in FIG. 9, a first separator material supply unit 91 supplies an elongated first separator material 11A wound in a roll to a predetermined position on a conveyor belt 90.

At a first position T1, a first camera 92 captures an image of the first separator material 11A supplied onto the conveyor belt 90, so as to detect, as a first positional displacement amount, a positional displacement amount of the first separator material 11A in a lateral direction that is a direction (Y-axis direction) orthogonal to a traveling direction (X-axis direction) of the conveyor belt 90 with respect to a first reference position.

At a second position T2, which is a position advanced in the traveling direction of the conveyor belt 90 with respect to the first position T1, an electrode supply unit 93 supplies an electrode 12 onto the first separator material 11A based on an electrode target position. In particular, in order to supply the electrode 12 to a predetermined position on the first separator material 11A, the electrode supply unit 93 supplies the electrode 12 based on a position obtained by correcting the electrode target position based on a first positional displacement amount and a first offset amount which is a lateral positional displacement amount between the first separator material 11A and the electrode 12 when a first positional displacement amount of the first separator material 11A with respect to the first reference position is zero and the electrode 12 is supplied based on the electrode target position.

A second camera 94 captures an image of the electrode 12 supplied onto the first separator material 11A at a third position T3 which is a position advanced in the traveling direction of the conveyor belt 90 with respect to the second position T2, so as to detect, as a second positional displacement amount, a lateral positional displacement amount of the electrode 12 with respect to a second reference position.

A second separator material supply unit 95 supplies an elongated second separator material 13A wound in a roll onto the conveyor belt 90, more specifically, at a position overlapping with the first separator material 11A in such a manner that the electrode 12 is sandwiched between the second separator material 13A and the first separator material 11A.

A joining head 96 descends based on the joining target position, and joins portions of the first separator material 11A and the second separator material 13A around the electrodes 12 by, for example, a thermocompression bonding method that performs pressure bonding by heating. In particular, in order to reliably join portions around the electrode 12, the joining target position is corrected based on the second positional displacement amount and a second offset amount which is the lateral positional displacement amount of the joining head 96 with respect to the electrode 12 when the second positional displacement amount of the electrode 12 with respect to the second reference position is zero and the joining head 96 is operated so as to perform joining at the joining target position, and the joining head 96 descends at the corrected joining target position to perform joining.

After the above process, the first separator material 11A and second separator material 13A which have been laminated are cut into a predetermined shape by a cutting blade 97a of a cutting unit 97, so that an electrode laminate including the first separator, the electrode, and the second separator 2 is formed.

With such a configuration, a position at which the electrode 12 is supplied can be corrected in accordance with a lateral positional displacement of the first separator material 11A, and a positional displacement between the first separator material 11A and the electrode 12 can be suppressed. Further, according to a lateral positional displacement of the electrode 12, a position at which joining is performed by the joining head 96 can be corrected, and portions around the electrode 12 can be joined with high accuracy.

However, in the manufacturing apparatus shown in FIG. 9 described above, there is a case where the conveyor belt 90 meanders when driven, and a lateral positional displacement occurs while a portion where the first positional displacement amount of the first separator material 11A is detected moves from the first position T1 to the second position T2. In this case, even if the electrode target position is corrected based on the first positional displacement amount of the first separator material 11A detected at the first position T1, and the electrode 12 is supplied at the second position T2 based on the corrected electrode target position, a positional displacement occurs between the first separator material 11A and the electrode 12.

Further, in the manufacturing apparatus shown in FIG. 9 described above, there is a case where the conveyor belt 90 meanders when driven, and a lateral positional displacement occurs while the electrode 12 on the conveyor belt 90 moves from the third position T3 to the fourth position T4. In this case, even if the joining target position is corrected based on the second positional displacement amount of the electrode 12 detected at the third position T3, and the joining head 96 is caused to descend at the fourth position T4 based on the corrected joining target position, portions around the electrode 12 cannot be joined with high accuracy.

The present invention has been made in an effort to solve the above problems, and it is an object of the present invention to provide a manufacturing apparatus for an electrode laminate, the manufacturing apparatus capable of suppressing occurrence of a positional displacement between a first separator and an electrode by suppressing the influence of meandering of a conveyor belt conveying a first separator material and the electrode, and manufacturing an electrode laminate in which portions around the electrode are joined with high accuracy.

BRIEF DESCRIPTION OF THE INVENTION

A manufacturing apparatus for an electrode laminate of the present invention is a manufacturing apparatus for an electrode laminate having a structure in which an electrode is sandwiched between a first separator and a second separator. The manufacturing apparatus includes:

a conveyor belt configured to convey an elongated first separator material and an elongated second separator material in a direction along a longitudinal direction of the conveyor belt while holding the first and second separator materials;

a first separator material supply unit configured to supply the first separator material onto the conveyor belt;

a first image pickup unit configured to detect, as a first positional displacement amount, a positional displacement amount of the first separator material in a lateral direction orthogonal to a traveling direction of the conveyor belt with respect to a first reference position by capturing an image of the first separator material supplied onto the conveyor belt at a first position;

an electrode supply unit configured to supply the electrode onto the first separator material based on an electrode target position at a second position which is located at a position advanced in a traveling direction of the conveyor belt with respect to the first position;

a second image pickup unit configured to detect, as a second positional displacement amount, a positional displacement amount in the lateral direction of the electrode with respect to the second reference position by capturing an image of the electrode supplied onto the first separator material at a third position which is at a position advanced in a traveling direction of the conveyor belt with respect to the second position;

a second separator material supply unit configured to supply the second separator material onto the first separator material so as to sandwich the electrode between the first separator material and the second separator material;

a joining head configured to join together, at the joining target position, portions of the first separator material and the second separator material around the electrode at a fourth position which is located at a position advanced in a traveling direction of the conveyor belt with respect to the third position;

a cutting unit configured to cut the first separator material and the second separator material to obtain the electrode laminate; and a storage unit configured to store information regarding a first movement amount which is an amount of movement in the lateral direction when a region to which the electrode is supplied on the conveyor belt when the conveyor belt is driven moves from the first position to the second position, and information regarding a second movement amount which is an amount of movement in the lateral direction when the region moves from the third position to the fourth position.

The electrode supply unit corrects the electrode target position based on the first positional displacement amount, a first offset amount which is a positional displacement amount in the lateral direction between the first separator material and the electrode when the first positional displacement amount is zero and the electrode is supplied based on the electrode target position, and the first movement amount obtained from information regarding the first movement amount, and supplies the electrode onto the first separator material based on the corrected electrode target position, and the joining head corrects the joining target position based on the second positional displacement amount, a second offset amount which is a positional displacement amount in the lateral direction of the joining head with respect to a position of the electrode when the second positional displacement amount is zero and the joining head is operated so as to join the first separator material and the second separator material at the joining target position, and the second movement amount obtained from information regarding the second movement amount, and joins the first separator material and the second separator material at the corrected joining target position.

The electrode supply unit is configured to sequentially supply a plurality of electrodes, and the storage unit may store information regarding the first movement amount and the information regarding the second movement amount for each of a plurality of regions to which the electrodes are supplied on the conveyor belt.

Further, the storage unit may be configured to store, as information regarding the first movement amount, a positional displacement amount in the lateral direction at the first position and a positional displacement amount in the lateral direction at the second position for each of a plurality of regions to which the electrodes are supplied, and stores, as information regarding the second movement amount, a positional displacement amount in the lateral direction at the third position and a positional displacement amount in the lateral direction at the fourth position for each of a plurality of regions to which the electrodes are supplied.

Further, a positional displacement amount in the lateral direction at the first position may be obtained by the first image pickup unit capturing an image of a region to which the electrode is supplied, a positional displacement amount in the lateral direction at the second position may be obtained by the third image pickup unit, installed at the second position, capturing an image of a region to which the electrode is supplied, a positional displacement amount in the lateral direction at the third position may be obtained by the second image pickup unit capturing an image of a region to which the electrode is supplied, and a positional displacement amount in the lateral direction at the fourth position may be obtained by the fourth image pickup unit, installed at the fourth position, capturing an image of a region to which the electrode is supplied.

According to an aspect of the present invention, an electrode target position, which is a target position for supplying an electrode, is corrected based on a first positional displacement amount which is a positional displacement amount of a first separator material in a lateral direction orthogonal to a traveling direction of a conveyor belt, a first offset amount which is a positional displacement amount in the lateral direction between the first separator material and the electrode when the first positional displacement amount is zero and the electrode is supplied based on the electrode target position, and a first movement amount which is an amount of movement in the lateral direction when a region to which the electrode is supplied moves from a first position to a second position. Accordingly, the electrode can be supplied to a position where the influence of meandering of the conveyor belt is suppressed and the occurrence of positional displacement between the first separator and the electrode can be suppressed.

Further, a joining target position, which is a target position for joining the first separator material and the second separator material by a joining head, is corrected based on a second positional displacement amount which is a positional displacement amount of the electrode, a second offset amount which is a lateral positional displacement amount of the joining head with respect to a position of the electrode when the second positional displacement amount is zero and the joining head is operated so as to perform joining at the joining target position, and a second movement amount which is an amount of movement in the lateral direction when a region to which the electrode is supplied moves from a third position to a fourth position. Accordingly, the first separator material and the second separator material can be joined together at a position where the influence of meandering of the conveyor belt is excluded, and portions around the electrode can be joined with high accuracy.

DESCRIPTION OF THE PREFERRED EMBODIMENTS

Hereinafter, exemplary embodiments of the present invention will be shown to explain characteristics of the present invention more specifically.

First, a structure of an electrode laminate will be briefly described, and then a method for manufacturing the electrode laminate will be described.

Figure 1:
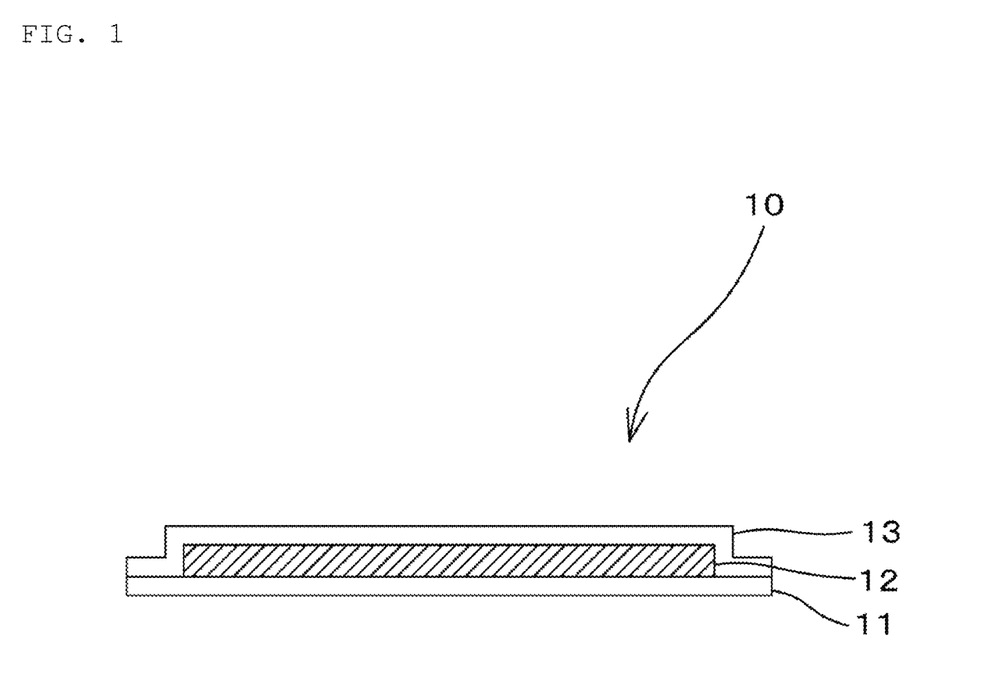
FIG. 1 is a cross-sectional view showing a structure of an electrode laminate.

As shown in FIG. 1, the electrode laminate 10 has a structure in which a first separator 11, an electrode 12, and a second separator 13 are laminated one on top of the other in the order shown.

The electrode 12 is either a positive or a negative electrode. When the electrode 12 is a positive electrode, it preferably includes a positive electrode current collector made of, for example, a metal foil, such as aluminum, and a positive electrode active material formed on both sides of the positive electrode current collector. When the electrode 12 is a negative electrode, it preferably includes a negative electrode current collector made of, for example, a metal foil, such as copper, and a negative electrode active material formed on both sides of the negative electrode current collector. A planar shape of the electrode 12 may be rectangular or non-rectangular.

The first and second separators 11 and 13 can be made of the same material, and for example, can be constituted by a microporous thin film made of polypropylene having excellent insulation.

Figure 2:
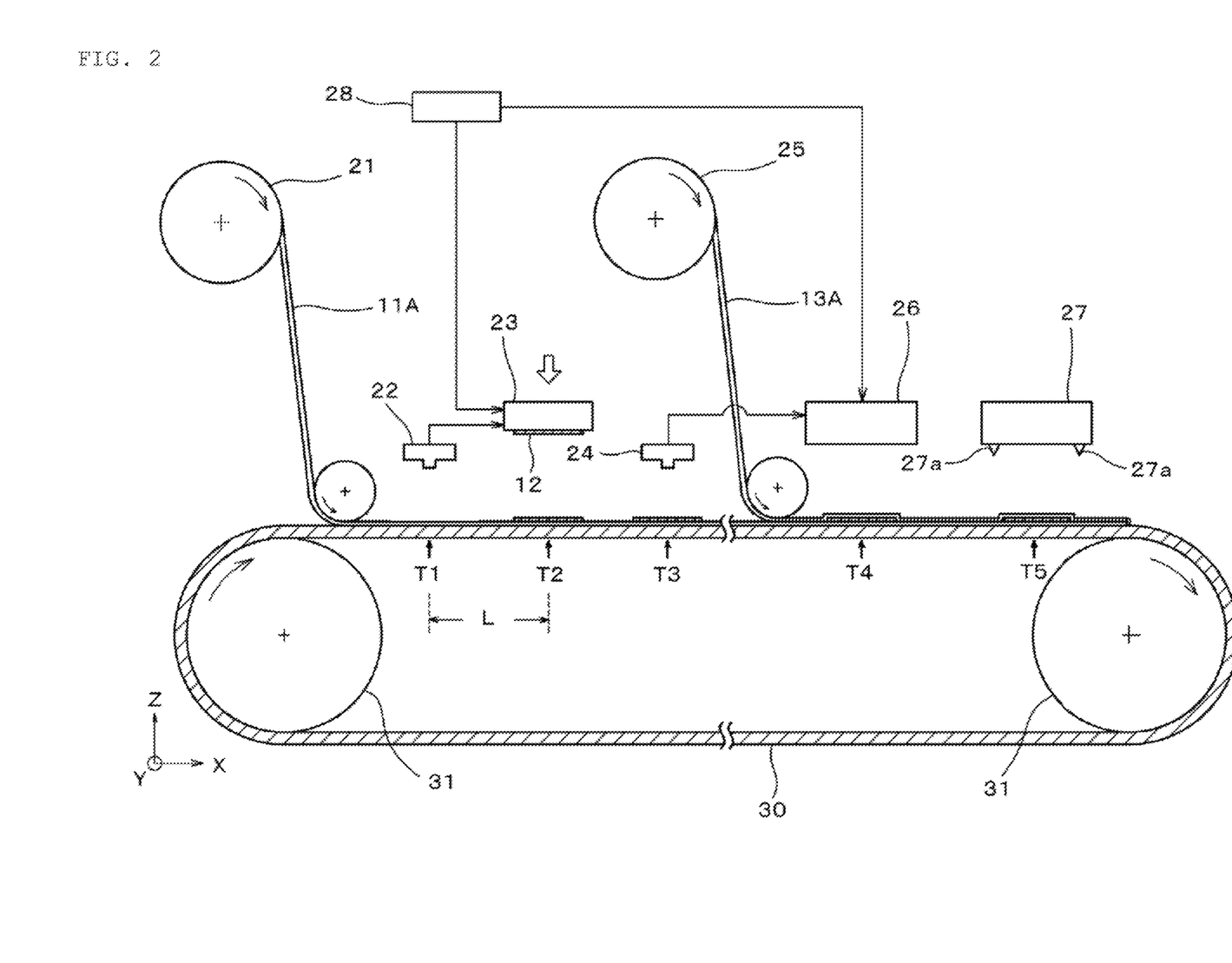
FIG. 2 is a side view showing a schematic configuration of a manufacturing apparatus for an electrode laminate according to an embodiment.

FIG. 2 is a side view showing a schematic configuration of a manufacturing apparatus for the electrode laminate 10 according to one embodiment of the invention. As shown therein, a first separator material supply unit 21 supplies an elongated first separator material 11A wound in a roll to a predetermined position on a conveyor belt 30. At this time, a supply rate of the first separator material 11A is controlled so that the first separator material 11A is appropriately supplied onto the conveyor belt 30 according to a traveling speed of the conveyor belt 30.

The conveyor belt 30 is made of, for example, metal, and conveys the elongated first separator material 11A and an elongated second separator material 13A in a direction along the longitudinal direction of the conveyor belt (the horizontal direction as viewed in FIG. 2) in a state of holding the first and second separator materials 11A and 13A. The conveyor belt 30 is driven by a drive roller 31.

The conveyor belt 30 includes one or more suction hole (not shown). The first separator material 11A supplied onto the conveyor belt 30 is held on the conveyor belt 30 by being sucked downward through the suction hole. Further, the second separator material 13A is supplied onto the first separator material 11A and is sucked downward through the first separator material 11A to be held on the first separator material 11A.

In FIG. 2, a first to fifth positions T1 to T5 represent positions along an X-axis direction, that is, positions in a traveling direction of the conveyor belt 30. The second position T2 is a position advanced in the traveling direction of the conveyor belt 30 with respect to the first position T1 and the third position T3 is a position advanced in the traveling direction of the conveyor belt 30 with respect to the second position T2. Further, the fourth position T4 is a position advanced in the traveling direction of the conveyor belt 30 with respect to the third position T3 and the fifth position T5 is a position advanced in the traveling direction of the conveyor belt 30 with respect to the fourth position T4.

Note that, the first and second positions T1 and T2 (as well as the second and third positions T2 and T3) are spaced apart by a distance (an electrode pitch) L, which will be described further below. Further, the distance between the third and fourth positions T3 and T4 is 3 L.

At the first position T1, a first camera 22 captures an image of the first separator material 11A supplied onto the conveyor belt 30, so as to detect, as a first positional displacement amount, a positional displacement amount of the first separator material 11A in a lateral direction (Y-axis direction) that is orthogonal to the traveling direction (X-axis direction) of the conveyor belt 30 with respect to a first reference position Y1 (not shown). The first reference position Y1 is a reference position in the lateral direction and is an optional reference position set within a field of view of the first camera 22.

As used herein, the "lateral", and the "lateral direction" mean a direction (Y-axis direction) orthogonal to the traveling direction of the conveyor belt 30.

At the second position T2, an electrode supply unit 23 supplies the electrode 12 onto the first separator material 11A based on an electrode target position. The electrode target position is a target position for determining a supply position of the electrode 12 in the lateral direction. That is, by supplying the electrode 12 to the electrode target position, the electrode 12 can be placed at a desired position on the first separator material 11A. The electrode target position is corrected by a method described below which compensates for lateral positional displacement due to meandering of the conveyor belt 30, and the like.

Note that the electrode supply unit 23 supplies a respective electrode 12 to the first separator material at predetermined time intervals. Since the first separator material 11A is conveyed on the conveyor belt 30, the electrode 12 is supplied onto the first separator material 11A at predetermined intervals. Here, a distance shown by a reference symbol L in FIG. 2 between adjacent two of the electrodes 12 supplied onto the first separator material 11A is referred to as an electrode pitch. The electrode pitch L is, for example, 102 mm.

At the third position T3, a second camera 24 captures an image of the electrode 12 supplied onto the first separator material 11A, so as to detect, as a second positional displacement amount, a positional displacement amount of the electrode 12 in the lateral direction with respect to a second reference position Y2. The second reference position Y2 is a reference position in the lateral direction and is an optional reference position set within a field of view of the second camera 24.

A second separator material supply unit 25 supplies the elongated second separator material 13A wound in a roll onto the conveyor belt 30, more specifically, at a predetermined position overlapping with the first separator material 11A, in such a manner that the electrode 12 is sandwiched between the second separator material 13A and the first separator material 11A. At this time, a supply rate of the second separator material 13A is controlled so that the second separator material 13A is appropriately supplied onto the conveyor belt 30 according to a traveling speed of the conveyor belt 30.

A joining head 26 is provided with, for example, a heater, and is configured to be able to ascend and descend (move up and down as viewed in FIG. 1). At the fourth position T4, the joining head 26 descends based on a joining target position, and joins portions of the first separator material 11A and the second separator material 13A around the electrodes 12 by, for example, a thermocompression bonding method that performs pressurization while heating the portions around the electrode 12. The joining target position defines a position in the lateral direction and is a position at which the electrode 12 is assumed to be placed. The joining target position is corrected by a method described below which compensates for a lateral positional displacement due to meandering of the conveyor belt 30, and the like.

At the fifth position T5, in order to form an electrode laminate 10, a cutting unit 27 cuts the first separator material 11A and the second separator material 13A with a cutting blade 27a so as to cut a predetermined region including the electrode 12. In this manner, the electrode laminate 10 including the first separator 11, the electrode 12, and the second separator 13 is obtained.

A storage unit 28 stores information regarding a first movement amount, which is an amount of lateral movement when a region to which the electrode 12 is supplied moves from the first position T1 to the second position T2 on the conveyor belt 30 when the conveyor belt 30 is driven, and information regarding a second movement amount, which is an amount of lateral movement when the region moves from the third position T3 to the fourth position T4.

In the present embodiment, the conveyor belt 30 is divided into a plurality of regions according to supply positions of the electrode 12, and the storage unit 28 stores information regarding the first and second movement amounts for a plurality of the regions.

Figure 3:
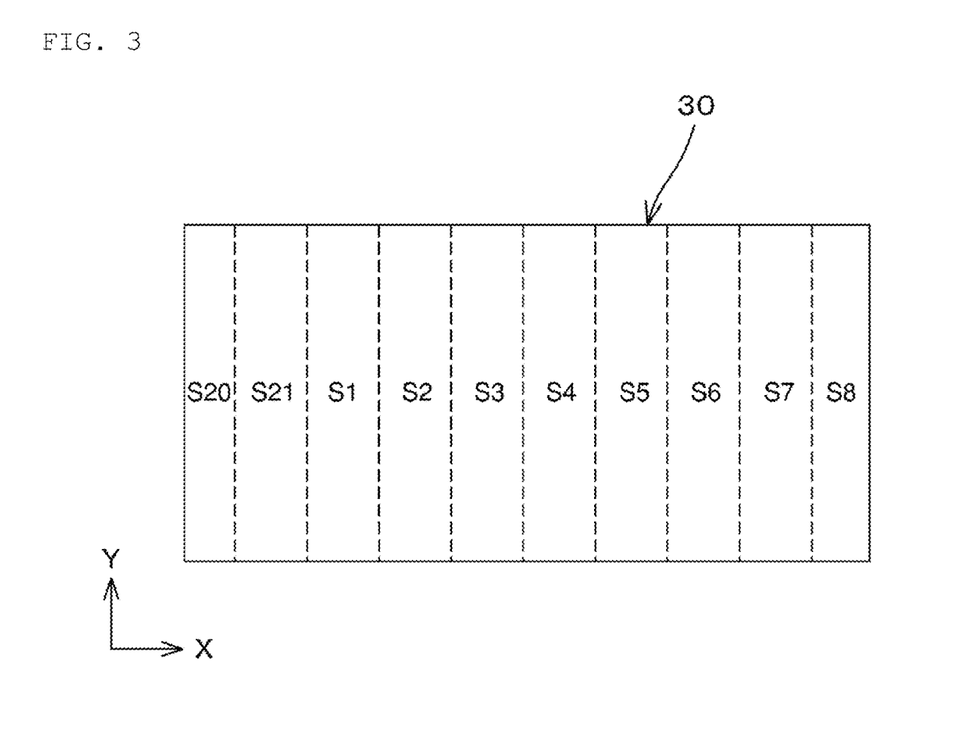
FIG. 3 is a plan view showing each region in a case where a region on a conveyor belt is divided into 21 regions.

In the present embodiment, the number of regions corresponds to the peripheral length of the conveyor belt 30 divided by the electrode pitch L. Here, an example will be described where the peripheral length of the conveyor belt 30 is 2142 mm, the electrode pitch is 102 mm, and the region on the conveyor belt 30 is divided into 21 regions (2142/102) regions S1 to S21. Thus, FIG. 3 (which is a plan view of an upper surface of the conveyor belt 30) shows adjacent regions S20, S21, SD1, S2, S3, S4, S5, S6, S7 and S8 which appear on the upper surface of the conveyor belt 30 at a given point in time.

Here, the information regarding the first movement amount may be information indicating the first movement amount itself, or may be information necessary for obtaining the first movement amount. Similarly, the information regarding the second movement amount may be information indicating the second movement amount itself, or may be information necessary for obtaining the second movement amount.

In the present embodiment, the information regarding the first movement amount is information necessary for obtaining the first movement amount, the information regarding the second movement amount is information required for obtaining the second movement amount. Specifically, the storage unit 28 stores, as the information regarding the first and second movement amounts, mapping data indicating the lateral positional displacement amount of the edge of the conveyor belt 30 as each of the regions S1 to S21 on the conveyor belt 30 move to the first position T1, the second position T2, the third position T3, and the fourth position T4 at the time the conveyor belt 30 is driven.

Figure 4:
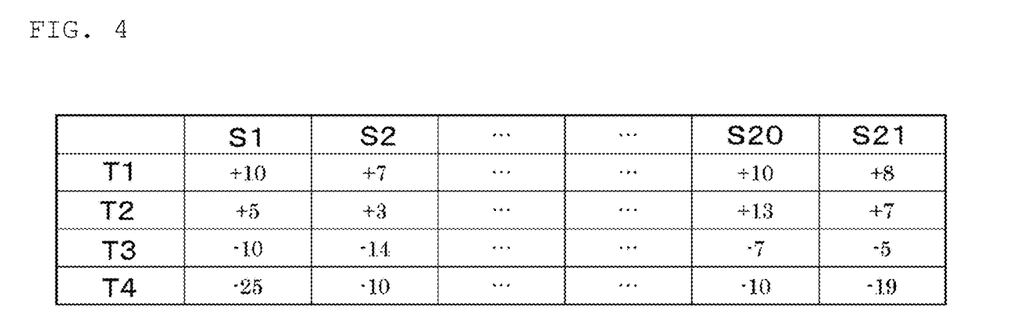
FIG. 4 is a diagram showing an example of mapping data stored in a storage unit.

FIG. 4 is a diagram showing an example of the mapping data stored in the storage unit 28. As shown in FIG. 4, the mapping data includes a positional displacement amount of the edge of the conveyor belt 30 at the first position T1, the second position T2, the third position T3, and the fourth position T4 for each of the 21 divided regions S1 to S21. Note that the unit of the positional displacement amount is µm.

Figure 5:
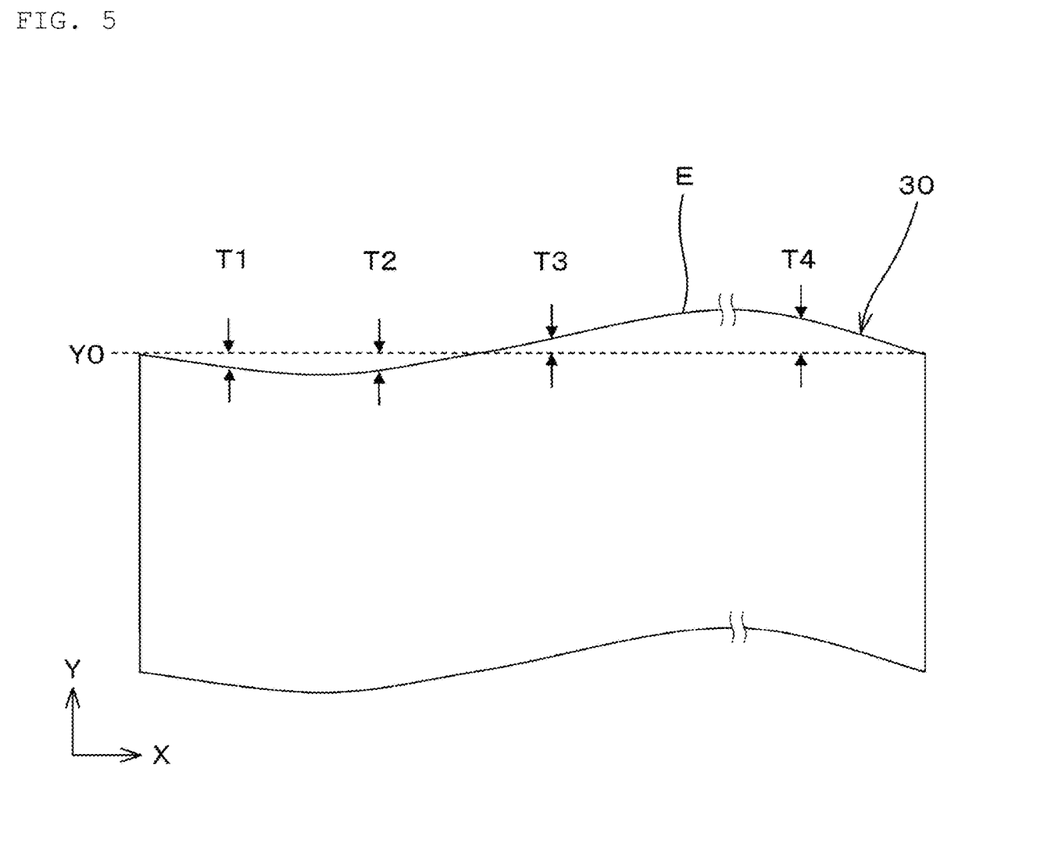
FIG. 5 is a view showing a positional displacement amount of an edge of a conveyor belt at first, second, third and fourth positions.

Here, as shown in FIG. 5, a lateral distance between a reference position Y0 for detecting a positional displacement and an edge E of the conveyor belt 30 is set as a positional displacement amount of the edge of the conveyor belt 30. A lateral positional displacement of each of the regions S1 to S21 on the conveyor belt 30 is caused by the fact that the edges at opposite ends of the conveyor belt 30 are not parallel but distorted and that the conveyor belt 30 meanders when driven.

The first movement amount described above is obtained based on a difference between a positional displacement amount of the edge at the first position T1 and the positional displacement amount of the edge at the second position T2, and the second movement amount is obtained based on a difference between a positional displacement amount of the edge at the third position T3 and a positional displacement amount of the edge at the fourth position T4. The reference position Y0 for detecting a positional displacement amount of the edge of the conveyor belt 30 can be set to an optional position since only the first movement amount and the second movement amount need to be obtained.

In the example shown in FIG. 4, for example, the positional displacement amount of the region S1 of the conveyor belt 30 at the first position T1 is 10 µm, the positional displacement amount of the region S1 at the second position T2 is 5 µm, the positional displacement amount of the region S1 at the third position T3 is −10 µm, and the positional displacement amount of the region S1 at the fourth position T4 is −25 µm. In this case, the first movement amount of the region S1 as it moves from the first position T1 to the second position T2 is −5 (5−10) µm and the second movement amount of the region S1 as it moves from the third position T3 to the fourth position T4 is −15 (−25−(−10)) µm.

Figure 6:
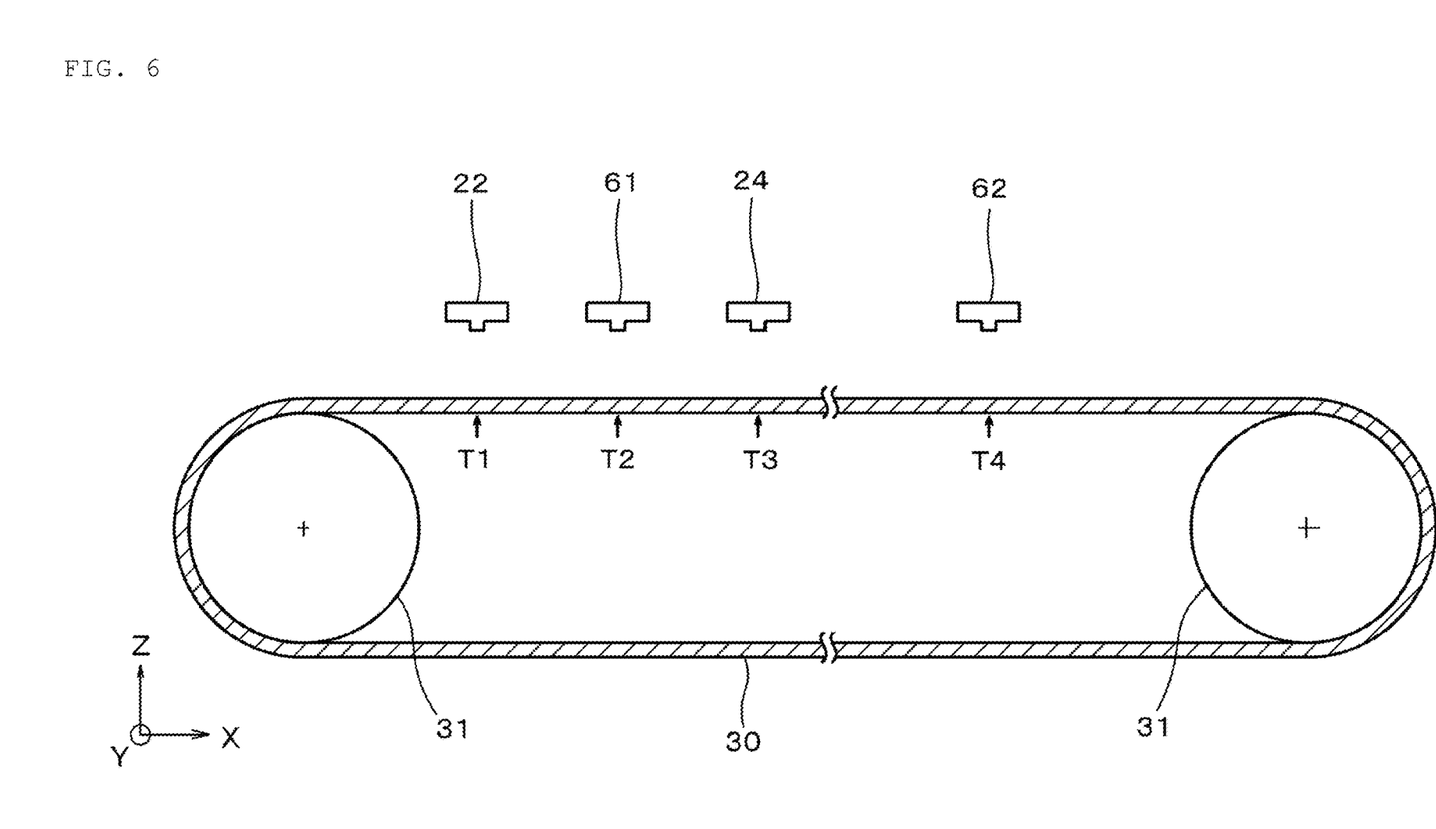
FIG. 6 is a diagram for explaining a method for creating the mapping data.

A method for creating the above-described mapping data will be described with reference to FIG. 6. In the manufacturing apparatus for an electrode laminate according to the present embodiment, as described above, the first camera 22 is provided at the first position T1 and the second camera 24 is provided at the third position T3. When the mapping data is created, a third camera 61 is further provided at the second position T2 and a fourth camera 62 is provided at the fourth position T4.

In order to create the mapping data, the conveyor belt 30 is driven, and images at a position of the edge of the conveyor belt 30 in the region S1 are captured by the first camera 22, the third camera 61, the second camera 24, and the fourth camera 62 sequentially. From the obtained images, positional displacement amounts in the lateral direction at the first position T1, the second position T2, the third position T3, and the fourth position T4 are obtained. By a similar method, a positional displacement amount of the edge of the conveyor belt 30 in each of the other regions S2 to S21 is also obtained. By such a method, with respect to each of the regions S1 to S21, the mapping data that defines a positional displacement amount of the edge of the conveyor belt 30 at the first position T1, the second position T2, the third position T3, and the fourth position T4 is created.

According to the mapping data creation method described above, it is possible to use the first camera 22 and the second camera 24 of the manufacturing apparatus for an electrode laminate. Further, by providing the third camera 61 at the second position T2 and the fourth camera 62 at the fourth position T4, and capturing an image of the conveyor belt 30 being driven, it is possible to easily obtain the mapping data.

However, the method for creating the mapping data is not limited to the above-described method, and the mapping data can be created by any other suitable creation method.

Further, a positional displacement amount included in the mapping data may be a positional displacement amount of another reference position, for example, a center position in the lateral direction of the conveyor belt 30, instead of a positional displacement amount of the edge of the conveyor belt 30.

Here, a method for correcting the electrode target position which is a target position when the electrode 12 is supplied will be described. The electrode target position is corrected based on the first positional displacement amount of the first separator material 11A detected by the first camera 22, a first offset amount, and the above-described first movement amount. The first offset amount is a lateral positional displacement amount (as measured in the Y-axis direction) between the first separator material 11A and the electrode 12 when the first positional displacement amount is zero and the electrode 12 is supplied to the electrode target position.

Figure 7:
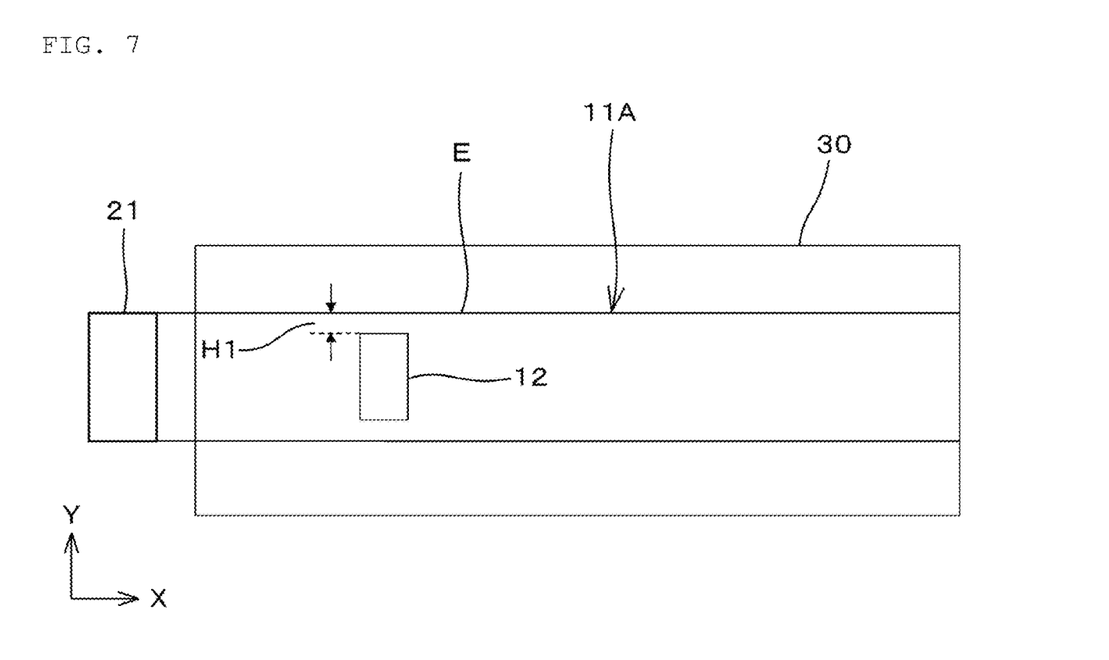
FIG. 7 is a diagram for explaining a first offset amount.

FIG. 7 is a diagram for explaining the first offset amount. In the present embodiment, when the first positional displacement amount of the first separator material 11A is zero and the electrode 12 is supplied to the electrode target position, in a state where a distance between one end E of the first separator material 11A in the lateral direction and the electrode 12 is a predetermined distance H1, a lateral positional displacement amount between the first separator material 11A and the electrode 12 is zero. That is, if the distance between the electrode 12 and the one end E in the lateral (Y-axis) direction of the first separator material 11A is H1, the first offset amount is zero. The predetermined distance H1 may be, by way of example, 2.5 mm.

Therefore, when the first positional displacement amount is zero and the distance between the electrode 12 and the one end E of the first separator material 11A when the electrode 12 is supplied to the electrode target position is H2, the distance H2−H1 is the first offset amount. The first offset amount is obtained in advance before manufacturing the electrode laminate 10.

Note that, the distance between the upper edge of the electrode 12 and the upper end E of the first separator material 11A (again, as measured in the Y-axis direction) when the first positional displacement amount is zero and the electrode 12 is supplied to the electrode target position may be adjusted to H1. In this case, the first offset amount is zero.

The corrected electrode target position is obtained by shifting the electrode target position before correction in the Y-axis direction by a distance obtained by adding together the first positional displacement amount of the first separator material 11A on a target region to which the electrode 12 is supplied, which is detected by the first camera 22, the first offset amount obtained in advance, and the first movement amount obtained from the information regarding the first movement amount stored in the storage unit 28. The first positional displacement amount of the first separator material 11A on a target region to which the electrode 12 is supplied is, for example, the first positional displacement amount of the first separator material 11A on the region S1 when the electrode 12 is supplied to the region S1.

The electrode supply unit 23 corrects the electrode target position by the above-described method, and supplies the electrode 12 onto the first separator material 11A based on the corrected electrode target position.

For example, when reference is made to the mapping data shown in FIG. 4, the first movement amount of the section of conveyor belt 30 corresponding to region S1 as it moves between the first position T1 and the second position T2 is −5 (5-10) µm. Therefore, for example, when the first positional displacement amount on the region S1 detected by the first camera 22 is 20 μm, the electrode supply unit 23 sets, as the corrected electrode target position, the electrode target position shifted in the Y-axis direction by a distance obtained by adding the first offset amount and 15 (−5+20) μm, and the electrode 12 is supplied to the conveyer belt 30 at the corrected electrode target position. In this manner, the electrode 12 can be supplied to a desired position on the first separator material 11A in the region S1 on the conveyor belt 30.

It should be noted that the electrode target position may be corrected, for example, by a control unit (not shown) and the electrode supply unit 23 may supply the electrode 12 based on the corrected electrode target position. In that case, the control unit for correcting the electrode target position and the electrode supply unit 23 correspond to the electrode supply unit of the present invention.

As described above, by correcting the electrode target position based on the first positional displacement amount, it is possible to correct the supply position of the electrode 12 based on the positional displacement amount of the first separator material 11A. Further, by correcting the electrode target position based on the first offset amount, a lateral positional relationship between the first separator material 11A and the electrode 12 can be set to an intended positional relationship.

Further, in the present embodiment, the electrode target position is corrected based on the first movement amount which is an amount of lateral movement when a region to which the electrode 12 is supplied on the conveyor belt 30 moves from the first position T1 which is a position where a positional displacement amount of the first separator material 11A is detected to the second position T2 which is a position to which the electrode 12 is supplied. Accordingly, the electrode 12 can be supplied to an intended position on the first separator material 11A by eliminating the influence of meandering of the conveyor belt 30, and the like.

In particular, since the storage unit 28 stores, as the mapping data, lateral positional displacement amounts of all the regions S1 to S21 on the conveyor belt 30, when the electrodes 12 are sequentially supplied onto the conveyor belt 30, it is possible to supply all the electrodes 12 to an intended position on the first separator material 11A by suppressing the influence of meandering of the conveyor belt 30 and the like.

Further, since the first positional displacement amount of the first separator material 11A is detected at the first position T1 and the electrode 12 is supplied onto the first separator material 11A at the second position T2, by supplying a plurality of the electrodes 12 one after another on the first separator material 11A, detection of the first positional displacement amount and supply of the electrodes 12 can be performed at the same time, and manufacturing efficiency is improved.

Next, a method for correcting the joining target position, which is a target position at the time of joining by the joining head 26, will be described. The joining target position is corrected based on the second positional displacement amount of the electrode 12 detected by the second camera 24, a second offset amount, and the above-described second movement amount.

The second offset amount is a lateral positional displacement amount of the joining head 26 with respect to a position of the electrode 12 when the second positional displacement amount is zero and the joining head 26 is operated so as to perform joining at the joining target position. That is, the second offset amount is an actual positional displacement amount between the electrode 12 and the joining head 26 which is generated when the second positional displacement amount of the electrode 12 detected by the second camera 24 is zero and the joining head 26 is caused to descend to the joining target position. The second offset amount is obtained in advance before the electrode laminate 10 is manufactured.

Note that a lateral descending position of the joining head 26 may be adjusted in advance so that the second offset amount becomes zero.

The corrected joining target position is obtained by shifting the joining target position before correction in the Y-axis direction by a distance obtained by adding together the second positional displacement amount of the electrode 12 in a target region which is detected by the second camera 24, the second offset amount obtained in advance, and the second movement amount obtained from the information regarding the second movement amount stored in the storage unit 28. The above the second positional displacement amount of the electrode 12 in a target region is, for example, the second positional displacement amount of the electrode 12 on the region S1 when the region S1 is the target region, and portions around the electrode 12 on the region S1 are joined.

The joining head 26 modifies the joining target position by the above-described method and joins a portion around the electrode 12 of the first separator material 11A and the second separator material 13A at the corrected joining target position.

For example, when reference is made to the mapping data shown in FIG. 4, the second movement amount of the upper edge of the region S1 of the conveyor belt 30 as it moves between the third position T3 and the fourth position T4 is −15 (−25−(−10)) μm. Therefore, for example, when the second positional displacement amount of the electrode 12 on the region S1 detected by the second camera 24 is 20 μm, the joining head 26 descends to a position shifted from the joining target position in the Y-axis direction by a distance obtained by adding the second offset amount and 5 (−15+20) μm. In this manner, it is possible to join portions around the electrode 12 on the region S1 with high accuracy.

It is to be noted that the joining target position is corrected by, for example, a control unit (not shown), so that the joining head 26 joins the first separator material 11A and the second separator material 13A at the corrected joining target position. In that case, the control unit for correcting the joining target position and the joining head 26 correspond to the joining head of the present invention.

By correcting the joining target position based on the second positional displacement amount, it is possible to correct a position at which joining by the joining head 26 is performed based on a positional displacement amount of the electrode 12. Further, by correcting the joining target position based on the second offset amount, it is possible to join portions around the electrode 12 with high accuracy.

Furthermore, in the present embodiment, the joining target position is corrected based on the second movement amount which is an amount of lateral movement when a region to which the electrode 12 is supplied on the conveyor belt 30 moves from the third position T3 which is a position where a positional displacement amount of the electrode 12 is detected to the fourth position T4 which is a position at which joining is performed by the joining head 26. Accordingly, the joining head 26 can join portions of the first separator material 11A and the second separator material 13A around the electrode 12 with high accuracy while the influence of meandering of the conveyor belt 30 and the like is suppressed.

In particular, since the storage unit 28 stores, as the mapping data, lateral positional displacement amounts of all the regions S1 to S21 on the conveyor belt 30, even when the electrodes 12 are sequentially supplied onto the conveyor belt 30, it is possible to cause the joining head 26 to join portions around all the electrodes 12 with high accuracy while the influence of meandering of the conveyor belt 30 and the like is suppressed.

Further, since the second positional displacement amount of the electrode 12 is detected at the third position T3 and portions around the electrode 12 are joined at the fourth position T4, by supplying a plurality of the electrodes 12 one after another, detection of the second positional displacement amount of the electrode 12 and joining of the first separator material 11A and the second separator material 13A can be performed at the same time, and manufacturing efficiency is improved.

Figure 8:
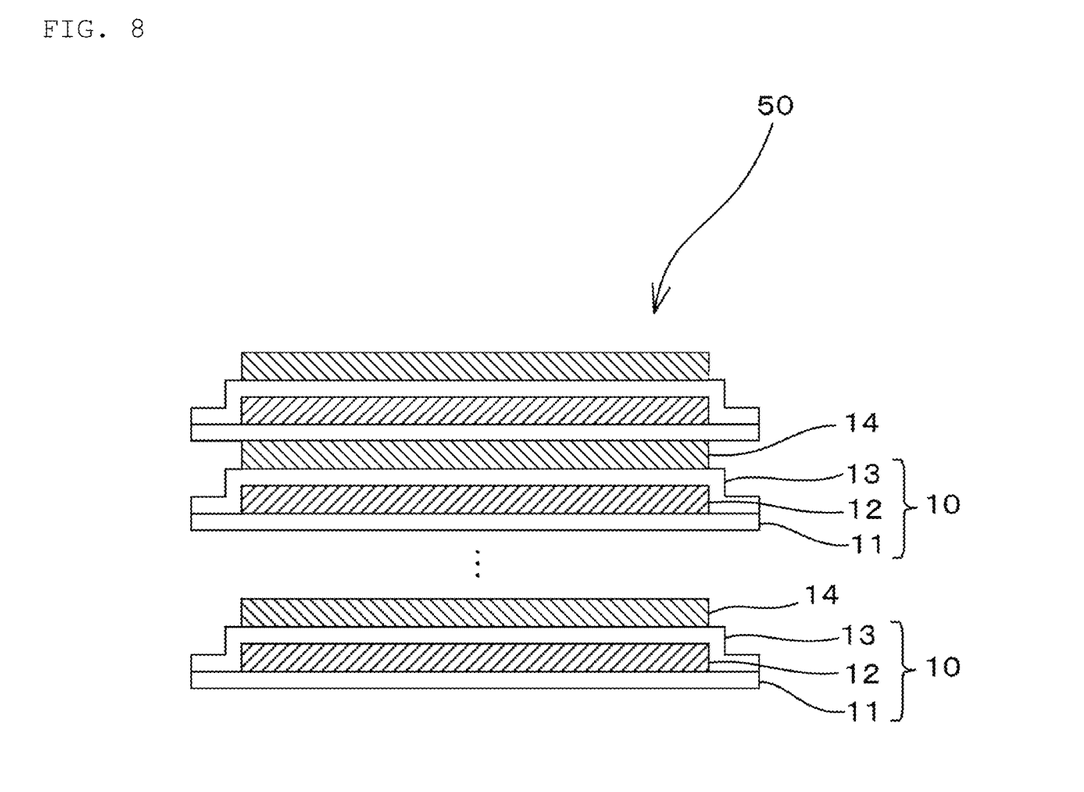
FIG. 8 is a cross-sectional view showing a structure of an electrode body formed using an electrode laminate.

Note that the produced electrode laminate 10 is used for creating an electrode body of a battery. That is, an electrode body 50 as shown in FIG. 8 is created by alternately laminating the produced electrode laminate 10 and a second electrode 14 different in polarity from the electrode 12. The electrode body 50 is used for manufacturing a battery, such as a lithium ion battery, for example.

The present invention is not limited to the above embodiment, and various applications and variations can be added within the scope of the present invention.

For example, the method for joining portions of the first separator material 11A and the second separator material 13A around the electrode 12 by the joining head 26 is not limited to the thermocompression bonding method, and for example, it is also possible to use a high-frequency bonding method or a laser bonding method. Further, joining of portions around the electrode 12 includes not only a mode in which portions around the electrode 12 are completely joined but also a mode in which the portions around the electrode 12 are partially joined.

DESCRIPTION OF REFERENCE SYMBOLS

10: electrode laminate
11: first separator
11A: first separator material
12: electrode
13: second separator
13A: second separator material
14: second electrode
21: first separator material supply unit
22: First camera
23: electrode supply unit
24: Second camera
25: second separator material supply unit
26: Joining head
27: cutting unit
28: Storage unit
30: conveyor belt
50: electrode body
61: Third camera
62: Fourth camera
T1: First position
T2: Second position
T3: Third position
T4: Fourth position
T5: Fifth position

The invention claimed is:

1. A manufacturing apparatus for an electrode laminate having a structure in which an electrode is sandwiched between first and second separators, the manufacturing apparatus comprising:
   a conveyor belt configured to convey elongated first and second separator materials along a longitudinal travelling direction of the conveyor belt;
   a first separator material supply configured to supply the first separator material onto the conveyor belt;
   a first image pickup configured to detect, as a first positional displacement amount, a positional displacement amount of the first separator material in a lateral direction orthogonal to the traveling direction of the conveyor belt with respect to a first reference position by capturing an image of the first separator material supplied onto the conveyor belt at a first position;
   an electrode supply unit configured to supply the electrode onto the first separator material, based on an electrode target position, at a second position located downstream of the first position in the traveling direction of the conveyor belt;
   a second image pickup unit configured to detect, as a second positional displacement amount, a positional displacement amount of the electrode relative to a second reference position as measured in the lateral direction by capturing an image of the electrode supplied onto the first separator material at a third position located downstream of the second position in the traveling direction of the conveyor belt;
   a second separator material supply unit configured to supply the second separator material onto the first separator material so as to sandwich the electrode between the first and second separator materials;
   a joining head configured to join together portions of the first and second separator materials around the electrode at a fourth position located downstream of the third position in the travelling direction of the conveyer belt;
   a cutter configured to cut the first separator material and the second separator material to obtain the electrode laminate; and
   a storage unit configured to store (a) information regarding a first movement amount of a first region of the conveyer belt in the lateral direction as it moves between the first and second positions and (b) information regarding a second movement amount of the first region of the conveyer belt in the lateral direction as it moves between the third and fourth positions;
   wherein:
   the electrode supply unit:
      (a) corrects the electrode target position based on:
         (i) the first positional displacement amount;
         (ii) a first offset amount which is a positional displacement amount in the lateral direction between the first separator material and the electrode when the first positional displacement amount is zero and the electrode is supplied based on the electrode target position; and
         (iii) the first movement amount obtained from the information regarding the first movement amount; and
      (b) supplies the electrode onto the first separator material based on the corrected electrode target position; and the joining head:
- (a) corrects the joining target position based on:
  - (i) the second positional displacement amount;
  - (ii) a second offset amount which is a positional displacement amount in the lateral direction of the joining head with respect to a position of the electrode when the second positional displacement amount is zero and the joining head is operated so as to join the first separator material and the second separator material at the joining target position; and
  - (iii) the second movement amount obtained from information regarding the second movement amount; and
- (b) joins the first separator material and the second separator material at the corrected joining target position.

2. The manufacturing apparatus for an electrode laminate according to claim 1, wherein:
the conveyer belt includes a plurality of regions;
the electrode supply unit is configured to sequentially supply a plurality of electrodes to the conveyer belt, each electrode being applied to a respective one of the regions; and
the storage unit stores information regarding the first and second movement amounts for each of the regions to which the electrodes are supplied on the conveyor belt.

3. The manufacturing apparatus for an electrode laminate according to claim 2, wherein:
the storage unit stores, as information regarding the first movement amount, a positional displacement amount in the lateral direction at the first position and a positional displacement amount in the lateral direction at the second position for each of a plurality of regions to which the electrodes are supplied, and stores, as information regarding the second movement amount, a positional displacement amount in the lateral direction at the third position and a positional displacement amount in the lateral direction at the fourth position for each of a plurality of regions to which the electrodes are supplied.

4. The manufacturing apparatus for an electrode laminate according to claim 3, wherein:
a positional displacement amount in the lateral direction at the first position is obtained by the first image pickup unit capturing an image of a region to which the electrode is supplied;
a positional displacement amount in the lateral direction at the second position is obtained by the third image pickup unit, installed at the second position, capturing an image of a region to which the electrode is supplied;
a positional displacement amount in the lateral direction at the third position is obtained by the second image pickup unit capturing an image of a region to which the electrode is supplied; and
a positional displacement amount in the lateral direction at the fourth position is obtained by the fourth image pickup unit, installed at the fourth position, capturing an image of a region to which the electrode is supplied.

\* \* \* \* \*